(12) United States Patent
Yaguchi et al.

(10) Patent No.: US 8,606,445 B2
(45) Date of Patent: Dec. 10, 2013

(54) INFORMATION CONTROL DEVICE FOR ELECTRIC VEHICLE, ELECTRIC VEHICLE, AND METHOD FOR GUIDING TIMING OF POWER CHARGE

(75) Inventors: Hiroyuki Yaguchi, Wako (JP); Mamiko Shinomiya, Wako (JP); Masaaki Kaizuka, Wako (JP); Masakatsu Honda, Wako (JP); Masato Fujioka, Wako (JP); Kunio Noguchi, Wako (JP); Satoru Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 13/010,702

(22) Filed: Jan. 20, 2011

(65) Prior Publication Data

US 2011/0213520 A1    Sep. 1, 2011

(30) Foreign Application Priority Data

Feb. 26, 2010   (JP) ................... 2010-041167

(51) Int. Cl.
*B60L 9/00* (2006.01)
*G08B 21/00* (2006.01)

(52) U.S. Cl.
USPC .......... 701/22; 701/31.4; 340/455; 340/636.1

(58) Field of Classification Search
USPC ............... 701/22, 31.4, 123; 180/65.1, 65.31; 340/455, 636.1
See application file for complete search history.

(56) References Cited

U.S. PATENT DOCUMENTS 6,323,775 B1 * 11/2001 Hansson ................... 701/22
2003/0135321 A1 * 7/2003 Kumazaki et al. ........ 701/112
2009/0021385 A1 * 1/2009 Kelty et al. .............. 340/660
2009/0027188 A1 * 1/2009 Saban ....................... 340/521
2010/0094496 A1 * 4/2010 Hershkovitz et al. ....... 701/22

FOREIGN PATENT DOCUMENTS

JP        5-137202       6/1993
JP        2008-100646    5/2008
JP        2009-177938    8/2009

OTHER PUBLICATIONS

Machine translation of JP 2009-177938.*
Japanese Office Action for corresponding JP Application No. 2010-041167, Aug. 14, 2013.

* cited by examiner

*Primary Examiner* — Thomas Tarcza
*Assistant Examiner* — Kevin Myhre
(74) *Attorney, Agent, or Firm* — Ditthavong Mori & Steiner, P.C.

(57) ABSTRACT

An information control device for an electric vehicle including a vehicle-mounted battery that is charged with electric power supplied from a power supply provided at an outside of the vehicle includes a lock operation detector, a remaining power detector, and a notification controller. The lock operation detector is configured to detect a lock operation of a door lock mechanism of the vehicle. The remaining power detector is configured to detect a remaining power amount of the vehicle-mounted battery. The notification controller is configured to control a notifying device to make a notification to the outside of the vehicle. The notification is indicative of information that recommends power charge of the vehicle-mounted battery if the remaining power amount is small when the door lock mechanism has been locked or is to be locked, based on detection results of the lock operation detector and the remaining power detector.

13 Claims, 11 Drawing Sheets

| NEAREST CHARGING STATION (A) | DESTINATION (B) | NOTIFICATION PATTERN |
|---|---|---|
| ✕ (UNREACHABLE) | ✕ (UNREACHABLE) | 1 (FAST BLINK + SOUND) |
| ○ (REACHABLE) | ✕ (UNREACHABLE) | 2 (SEVERAL-TIME BLINK) |
| ✕ (UNREACHABLE) | ○ (REACHABLE) | 3 (SOUND) |
| ○ (REACHABLE) | ○ (REACHABLE) | 3 (SOUND) |

FIG. 12

| LAST TRAVEL DISTANCE | NEAREST CHARGING STATION | DESTINATION | NOTIFICATION PATTERN |
|---|---|---|---|
| ✕ (UNREACHABLE) | ✕ (UNREACHABLE) | ✕ (UNREACHABLE) | REPEAT PATTERN 1 THREE TIMES |
| ○ (REACHABLE) | ✕ (UNREACHABLE) | ✕ (UNREACHABLE) | GIVE PATTERN 1 ONE TIME |
| ✕ (UNREACHABLE) | ○ (REACHABLE) | ✕ (UNREACHABLE) | REPEAT PATTERN 2 THREE-TIMES |
| ○ (REACHABLE) | ○ (REACHABLE) | ✕ (UNREACHABLE) | GIVE PATTERN 2 ONE TIME |
| ○ (REACHABLE) | ○ (REACHABLE) | ○ (REACHABLE) | NO NOTIFICATION |

PATTERN 1: FAST BLINK + SOUND
PATTERN 2: SEVERAL-TIME BLINK

INFORMATION CONTROL DEVICE FOR ELECTRIC VEHICLE, ELECTRIC VEHICLE, AND METHOD FOR GUIDING TIMING OF POWER CHARGE

CROSS-REFERENCE TO RELATED APPLICATIONS

The present application claims priority under 35 U.S.C. §119 to Japanese Patent Application No. 2010-041167, filed Feb. 26, 2010, entitled "INFORMATION CONTROL DEVICE FOR ELECTRIC VEHICLE, ELECTRIC VEHICLE, AND METHOD FOR GUIDING TIMING OF POWER CHARGE". The contents of this application are incorporated herein by reference in their entirety.

BACKGROUND OF THE INVENTION

1. Field of the Invention

The present invention relates to an information control device for an electric vehicle, the electric vehicle, and a method for guiding a timing of power charge.

2. Description of the Related Art

In recent years, an electric vehicle including a motor, and a hybrid vehicle including an engine and a motor have become popular. These vehicles also include a secondary battery (hereinafter, referred to as "battery") that stores electric power to be supplied to a driving motor. If the remaining power amount of the battery is decreased, the vehicle becomes incapable of traveling. The battery mounted on the vehicle is rechargeable with electric power supplied from a power supply outside the vehicle. However, charging takes a certain time. It is important to manage the remaining power amount. In general, the remaining power amount of the battery is recognized by a state of charge (SOC) that is determined based on an IV characteristic of the battery, and a difference between a charging amount to the battery and a discharging amount from the battery, etc.

Meanwhile, a technique for notifying a user (occupant) of the vehicle about the remaining power amount may be, for example, a "charging state display unit for a vehicle" disclosed in Japanese Unexamined Patent Application Publication No. 2009-177938 (hereinafter, referred to as document '938). The document '938 discloses a technique for displaying the remaining power amount on an outer section of a vehicle in association with a keyless entry system, and a technique for reducing electric power consumption such that the remaining power amount is displayed on the outer section of the vehicle if an approach sensor detects the approach of the user to the vehicle.

Unfortunately, the technique of the document '938 may cause an increase in cost. Also, the technique of the document '938 displays the remaining power amount if a human-presence sensor (approach sensor) such as an infrared sensor detects the approach of a person. Hence, the remaining power amount is displayed every time a person approaches the vehicle. The electric power may be wasted. If the remaining power amount is displayed for a person other than the user, the display may have no meaning.

The technique disclosed in the document '938 displays the remaining power amount by using the approach sensor that detects the approach of the user to the vehicle. That is, the technique notifies the user who is going to drive the vehicle. If the remaining power is none, the user may not drive the vehicle. Even if the user can drive the vehicle, a travelable distance may be small. The user has to charge the battery with power. The user needs a certain time for power charge, and user's valuable time may be wasted.

SUMMARY OF THE INVENTION

According to one aspect of the present invention, an information control device is for an electric vehicle. The information control device includes a lock operation detector, a remaining power detector, and a notification controller. The electric vehicle includes a vehicle-mounted battery that is charged with electric power supplied from a power supply provided at an outside of the electric vehicle. The lock operation detector is configured to detect a lock operation of a door lock mechanism of the electric vehicle. The remaining power detector is configured to detect a remaining power amount of the vehicle-mounted battery. The notification controller is configured to control a notifying device to make a notification to the outside of the electric vehicle. The notification is indicative of information that recommends power charge of the vehicle-mounted battery if the remaining power amount is small when the door lock mechanism has been locked or is to be locked, based on detection results of the lock operation detector and the remaining power detector.

According to another aspect of the present invention, an electric vehicle includes the above information control device for the electric vehicle.

According to further aspect of the present invention, a method is for guiding a timing of power charge for an electric vehicle. The electric vehicle travels by a vehicle-mounted battery that is charged with electric power supplied from a power supply provided at an outside of the electric vehicle. The electric vehicle includes an information control device. The information control device includes a lock operation detector, a remaining power detector, and a notification controller. The lock operation detector is configured to detect a lock operation of a door lock mechanism of the electric vehicle. The remaining power detector is configured to detect a remaining power amount of the vehicle-mounted battery. The notification controller is configured to control a predetermined notifying device to make a notification to the outside of the electric vehicle. The notification is indicative of information that recommends the power charge of the vehicle-mounted battery based on detection results of the lock operation detector and the remaining power detector. The method is performed by the notification controller of the information control device. The method includes guiding a timing of power charge by making the notification indicative of the information that recommends the power charge of the vehicle-mounted battery if the remaining power amount detected by the remaining power detector is small when the door lock mechanism has been locked or is to be locked.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a side view showing the overview of the electric vehicle, and FIG. 1B is a rear view showing the overview of the electric vehicle;

FIG. 10A illustrates an example in which a vehicle is unreachable to a destination or the nearest charging station, FIG. 10B illustrates an example in which the vehicle is reachable to the nearest charging station but is unreachable to the destination, FIG. 10C illustrates an example in which the vehicle is reachable to the destination but is unreachable to the nearest charging station, and FIG. 10D illustrates an example of guide for a charging station that is not on the route to the destination;

FIG. 11A illustrates an example in which a vehicle usually travels between a home and a destination, and FIG. 11B illustrates an example in which the vehicle makes a stop at somewhere; and FIG. 12 illustrates an example of a notification pattern table according to the sixth embodiment.

DESCRIPTION OF THE EMBODIMENTS

Figure 1A:
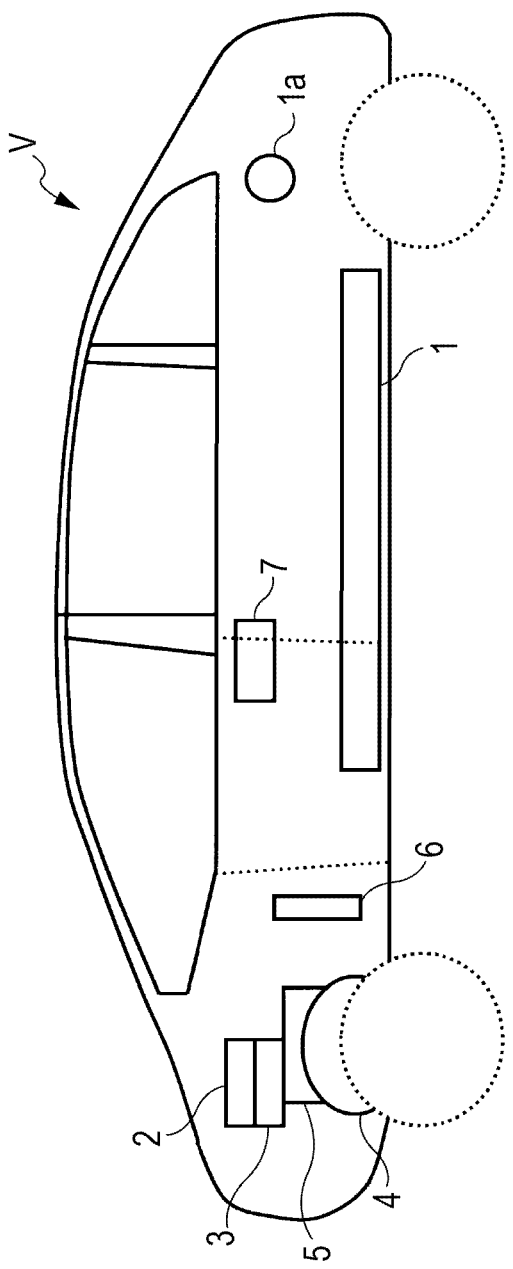
FIGS. 1A and 1B are conceptual diagrams showing a configuration of a vehicle including a remaining power notification system for an electric vehicle according to a first embodiment of the present invention, in particular.

Embodiments of the present invention for implementing an information control device for an electric vehicle, the electric vehicle, and a method for guiding a timing of power charge (hereinafter, merely referred to as "embodiments") will be described below with reference to the accompanying drawings, wherein like reference numerals designate corresponding or identical elements throughout the various drawings.

In any of the embodiments described below, if it is judged that the vehicle should be charged with power, a situation in which doors of an electric vehicle (hereinafter, occasionally referred to as "vehicle") are locked serves as a trigger, so that a notification indicative of information that recommends the user for power charge is made for a user outside the vehicle by using, for example, a lamp included in the vehicle.

Provided herein are the following embodiments. (1) A first embodiment is a basic embodiment. (2) A second embodiment is an embodiment in which a notification is inhibited from being made if a key or a user is in the vehicle cabin. (3) Third and fourth embodiments are embodiments in combination with a positioning system. (4) Fifth and sixth embodiments are embodiments taking into account a travelable distance.

First Embodiment

A configuration of a vehicle system according to this embodiment will be described with reference to FIGS. 1A and 1B. In the following description, a vehicle V is an electric vehicle. However, the vehicle V is not limited to the electric vehicle, and may be, for example, a hybrid vehicle (plug-in hybrid vehicle) or a fuel cell electric vehicle, as long as the vehicle includes a high-voltage battery (battery) 1 that is charged with electric power from a power supply outside the vehicle, such as a charging station or a home-use charging device.

Configuration of Vehicle

Referring to FIG. 1A, the vehicle V includes the high-voltage battery 1, a voltage control unit (VCU) 2, an inverter 3, and a driving motor 4, these components being included in a high-voltage electric system. The vehicle V also includes a down converter (step-down converter) 6 and a 12V battery (lead-acid battery) which is not shown, these components being included in a low-voltage electric system. The 12V battery is charged with electric power stored in the high-voltage battery 1.

The high-voltage battery 1 is a high-voltage assembled battery with several hundreds of volts including, for example, lithium-ion batteries connected in series. The high-voltage battery 1 is charged with electric power from a power supply outside the vehicle V through a charging port 1a. One end of the VCU 2 is connected with the high-voltage battery 1 through a high-voltage power cable and the other end thereof is connected with the inverter 3 through a high-voltage power cable. The VCU 2 has a function for adjusting a voltage of electric power (discharging electric power) that is supplied from the high-voltage battery 1 to the inverter 3, and for adjusting a voltage of electric power (charging electric power by regenerative power generation) that is supplied from the inverter 3 to the high-voltage battery 1. One end of the inverter 3 is connected with the VCU 2 through a high-voltage power cable and the other end thereof is connected with the driving motor 4 through a three-phase high-voltage power cable.

The inverter 3 includes a semiconductor switching element. The inverter 3 has a function for generating three-phase alternating current from direct current that is supplied from the high-voltage battery 1 through the VCU 2 and drives the driving motor 4 with the three-phase alternating current by pulse width modulation (PWM). Also, the inverter 3 has a function for converting three-phase regenerative current generated by the driving motor 4 into a direct-current electric power with which the high-voltage battery 1 is charged. Reference sign 1a denotes the charging port. The high-voltage battery 1 is charged with electric power from a power supply outside the vehicle (charging station or home-use charging device) through the charging port 1a.

Referring to FIG. 1A, the vehicle V includes the driving motor 4 and a gear box 5, these components being included in a power system. The driving motor 4 also serves as a power generator. The vehicle V is a front-wheel-drive vehicle. The driving motor 4 is mounted in a front section of the vehicle V. The high-voltage battery 1 is mounted below the floor of a center section of the vehicle V. The mounting positions mentioned above, however, are merely examples.

The vehicle V includes a door lock mechanism 7 that operates while being connected with the low-voltage electric system. The door lock mechanism 7 is a device that operates with electric power the voltage of which is lowered from a high voltage to a low voltage of 12V by the down converter 6. The door lock mechanism 7 is an electric lock and can remotely lock (unlock) doors of the vehicle V from the outside of the vehicle V by a key device (key of keyless entry system) 7a (see FIG. 2).

Figure 1B:
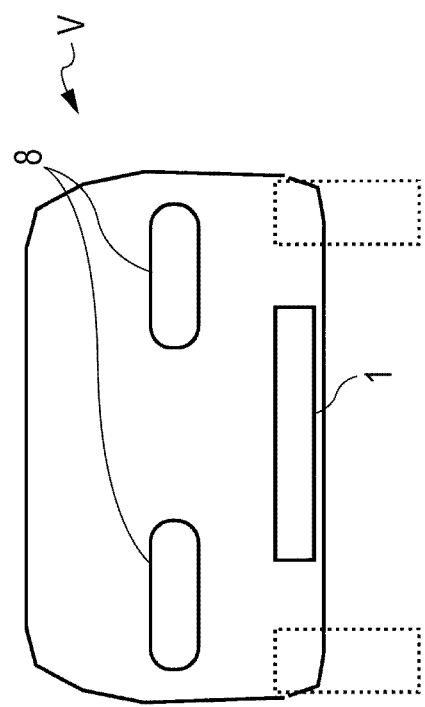

Referring to FIG. 1B, the vehicle V includes tail lamps 8 serving as a predetermined notifying device.

Though not shown, to detect the remaining power amount of the high-voltage battery 1, the vehicle V includes a voltage sensor that measures a voltage between output terminals of the high-voltage battery 1, and a current sensor that measures charging and discharging current of the high-voltage battery 1.

Next, an inner configuration of the vehicle V and the door lock mechanism 7 will be described below with reference to FIG. 2. The same reference signs refer the same elements as those shown in FIGS. 1A and 1B, and the redundant description will be omitted.

Figure 2:
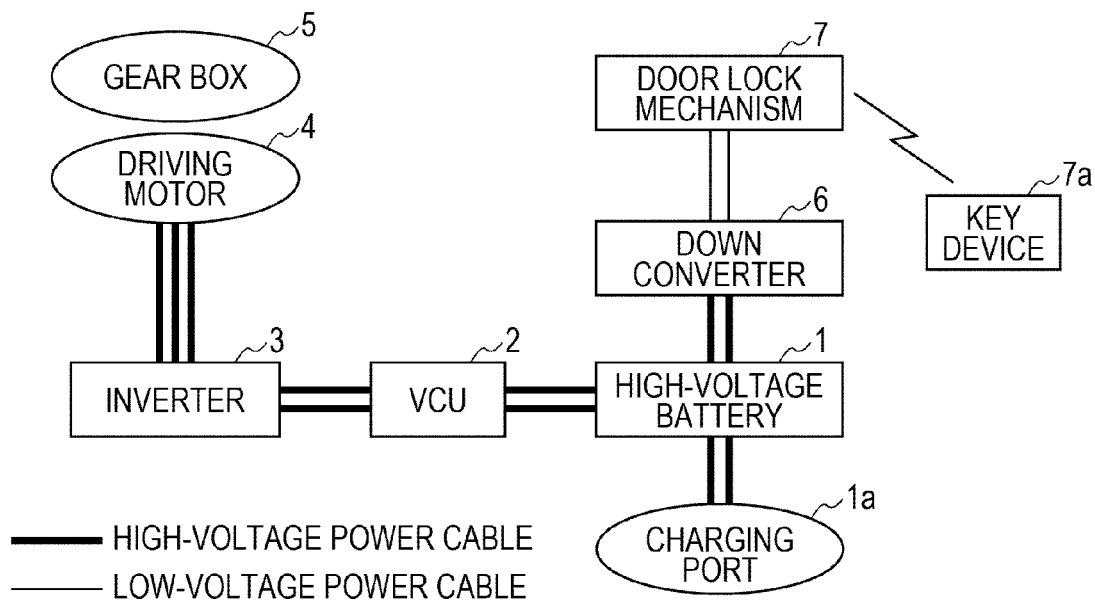
FIG. 2 illustrates an inner configuration of an electric vehicle and a door lock mechanism according to a second embodiment of the present invention.

Referring to FIG. 2, the high-voltage battery 1 is connected with the VCU 2, the down converter 6, and the charging port 1a through direct-current high-voltage power cables. The VCU 2 is connected with the inverter 3 through a direct-current high-voltage power cable. The inverter 3 is connected with the driving motor 4 through a three-phase high-voltage power cable. The down converter 6 is connected with the door lock mechanism 7, which serves as the electric lock, through a direct-current low-voltage power cable.

As described above, the door lock mechanism 7 is the electric lock, and employs the keyless entry system including the key device 7a that is carried by the user. The key device 7a remotely locks and unlocks the doors from the outside of the vehicle V. The keyless entry system is disclosed in, for example, Japanese Unexamined Patent Application Publication No. 9-170364 and No. 2001-241229 by the applicant of the subject application, and in the document '938. Hence, the detailed description will be omitted.

Information Control Device

The configuration of the information control device that performs control for recommending the user for power charge will be described with reference to FIG. 3.

Figure 3:
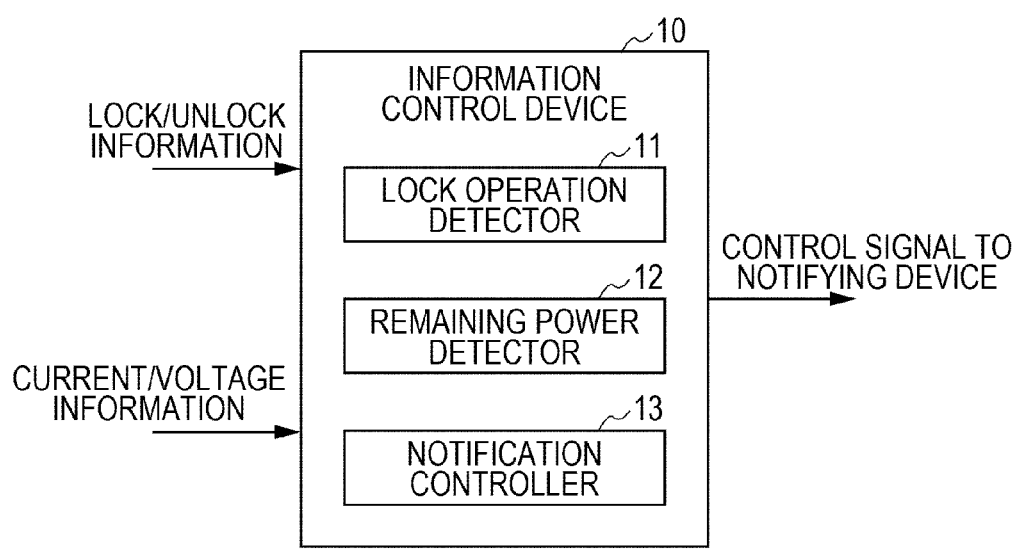
FIG. 3 illustrates a configuration of an information control device according to the second embodiment of the present invention.

Referring to FIG. 3, the information control device 10 includes a lock operation detector 11, a remaining power detector 12, and a notification controller 13.

The lock operation detector 11 has a function for detecting an operation of the door lock mechanism 7 based on lock/unlock information of the doors transmitted from the door lock mechanism 7. The remaining power detector 12 has a function for detecting the remaining power amount of the high-voltage battery 1 based on voltage information from the voltage sensor that measures the voltage between the output terminals of the high-voltage battery 1 and current information from the current sensor that measures the charging and discharging current of the high-voltage battery 1. As described above, the remaining power amount is constantly recognized by the state of charge (SOC) that is determined based on the IV characteristic of the high-voltage battery 1 and the difference between the charging amount to the high-voltage battery 1 and the discharging amount from the high-voltage battery 1, etc. The method for obtaining the SOC is disclosed in Japanese Unexamined Patent Application Publication No. 2008-281382 by the applicant of the subject application and in many other documents. Hence, the detailed description will be omitted.

The notification controller 13 has a function for controlling the tail lamps 8 serving as the predetermined notifying device to make a notification for the user, the notification being indicative of information that recommends the user for power charge of the high-voltage battery 1, if the remaining power amount of the high-voltage battery 1 is small when the door lock mechanism 7 has been locked, based on detection results of the lock operation detector 11 and the remaining power detector 12. For example, the notification controller 13 checks at a certain timing whether or not the remaining power amount of the high-voltage battery 1 is a certain value or smaller or a threshold or smaller, based on the detection result of the remaining power detector 12. The threshold is provided for judging whether or not the remaining power amount is an amount indicative of the necessity of power charge.

The notification controller 13 according to this embodiment does not notify the user about the information for recommending the user for power charge merely if the remaining power amount is below the threshold (i.e., a notification start condition is not satisfied). The notification controller 13 notifies the user for recommending the user for power charge, if the lock operation detector 11 recognizes that the doors of the vehicle V are locked because it is assumed that the notification start condition is satisfied. More specifically, in this embodiment, the notification for recommending the user for power charge is made if the remaining power amount is smaller than the threshold and when the user gets off the vehicle V and causes the door lock mechanism 7 to operate by the key device 7a.

The embodiment of the present invention does not intend that the user is not notified at all about the remaining power amount until the user gets off the vehicle V and locks the doors, but intends that no notification is made to the outside of the vehicle. The remaining power amount is typically displayed on an instrument panel or the like in the vehicle cabin in the form of an indicator.

That is, with the embodiment of the present invention, since the notification is made at the outside of the vehicle V even if the user misses the display of the remaining power amount on the indicator in the vehicle cabin or if the user watches the display but does not pay attention to the display. In other words, since the notification is made for the user who has gotten off the vehicle V, the user can be effectively recommended for power charge.

Control Flow

Figure 4:
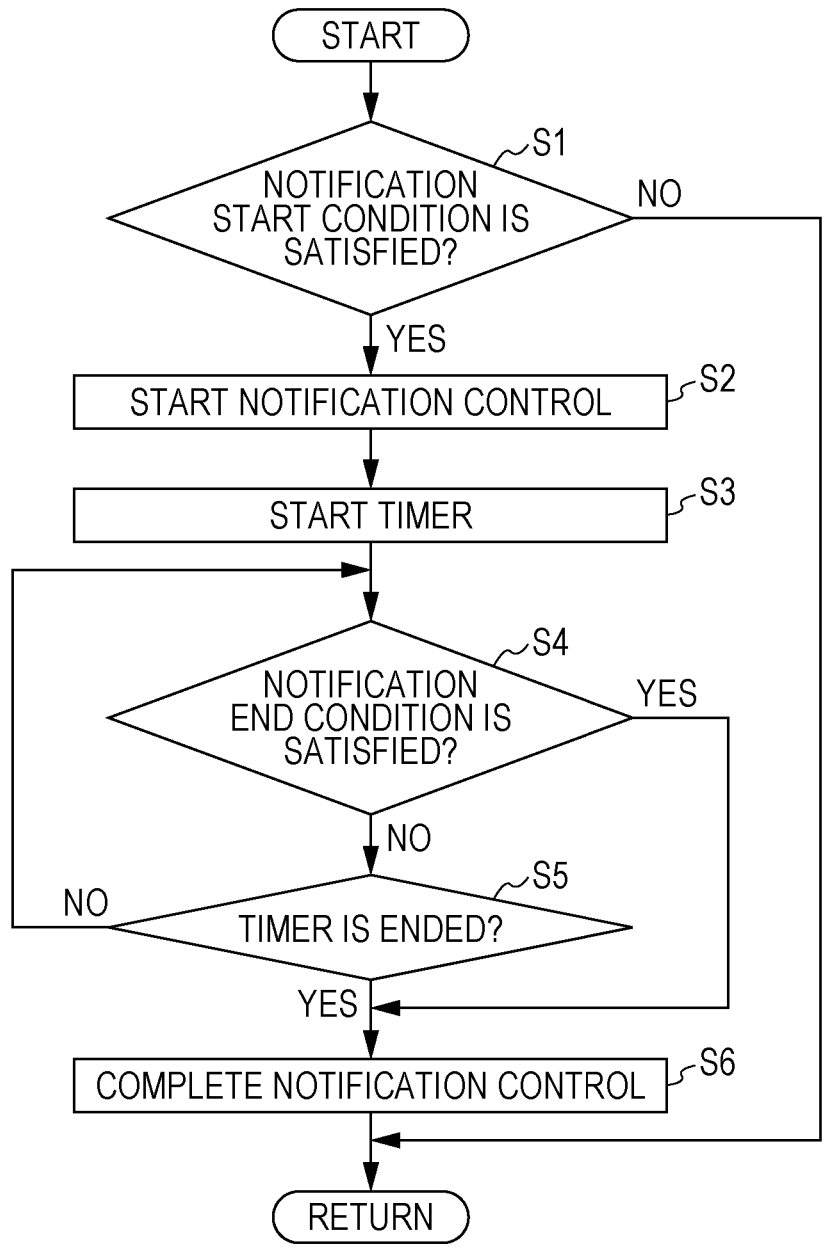
FIG. 4 is a flowchart showing processing from start to end of a notification according to the second embodiment of the present invention.

Processing from the start to end of the notification will be described with reference to FIG. 4. The control flow in FIG. 4 is executed by the notification controller 13 of the information control device 10.

The notification controller 13 judges whether or not the notification start condition is satisfied based on the detection result of the lock operation detector 11 and the detection result of the remaining power detector 12 (S1). The notification controller 13 judges that the notification start condition is satisfied if the remaining power amount of the high-voltage battery 1 is the threshold or smaller and if the state of the door lock mechanism 7 is changed to the lock state (YES in S1). In contrast, if the notification start condition is not satisfied (NO in S1), the processing is temporarily ended (RETURN).

The control flow may be started, for example, when the shift position of a shift lever device is changed to a parking position (P position) or when an ignition switch is turned OFF. Alternatively, the control flow may be started, for example, when a human-presence sensor (refer to a second embodiment which will be described later) in the vehicle cabin no longer detects (senses) a person. As described above, various kinds of start conditions may be used for the control flow.

In step S1, if the notification start condition is satisfied (YES in S1), that is, if the remaining power amount of the high-voltage battery 1 is small when the user locks the doors, the notification controller 13 controls the notifying device such as the tail lamps 8, to start the control for notifying the user who has gotten off the vehicle V about that the remaining power amount is small, by using light (S2). Then, the notification controller 13 starts a timer (S3). Accordingly, the user outside the vehicle V is recommended for power charge of the high-voltage battery 1 by the notifying device such as the tail lamps 8.

Notifying the user for a long time is not effective and results in the waste of the electric power. The notification controller 13 judges whether or not a notification end condition is satisfied (S4). If the condition is satisfied (YES in S4), the processing goes to step S6, in which the notification control is completed. Accordingly, the notification by the notifying device such as the tail lamps 8 is ended. The notification end condition may be satisfied if the doors are unlocked.

Although the notification end condition is not satisfied (NO in S4), if the timer which has been started in step S3 reaches the end (if a predetermined time elapses), the processing goes to step S6, in which the notification control is completed (YES in S5). As mentioned above, notifying the user for a long time is not effective and wastes the electric power. In contrast, if the timer does not reach the end, the processing goes to step S4 and the processing is continued. The end of the timer may be considered as a kind of the notification end condition. However, in this embodiment, the end of the timer is distinguished from the notification end condition.

When the user gets off the vehicle V, the user turns OFF the ignition switch of the vehicle V. In the vehicle V, the electric power is continuously supplied from the 12V battery (not shown) to the information control device 10 and the notifying device even after the ignition switch is turned OFF at least until the notification is ended (at least the notification control is ended). This point is also applied to any of the following embodiments.

Advantage of Embodiment

With the aforementioned first embodiment, since the notification is made for the user who has just gotten off the vehicle V, at a timing when the user is going to stay away from the vehicle V for a while, the user can be effectively recommended for power charge. That is, even if the user misses the display of the remaining power amount on the indicator in the vehicle cabin or if the user does not pay attention to the display on the indicator, the user can notice that power charge is required (or the timing for charge can be guided to the user). The user can charge the battery with power, for example, while the user does his/her shopping. Accordingly, the charging time can be effectively used. Hence, a problem of related art, in particular, running out of the remaining power of the battery although the user is going to drive the vehicle V after the shopping, can be avoided. If the state of no remaining power is displayed for the user when the user approaches the vehicle V to drive the vehicle V, such display has no meaning for the effective use of time.

With the first embodiment, since no notification is made during traveling, unnecessary information is not provided for the people around the vehicle V, such as a person who drives the other vehicle. With the first embodiment, since only devices that are typically mounted on the vehicle V are used, the cost can be decreased as compared with a case in which devices such as a sonar and a radar are provided like the related art.

Modification of Embodiment

The notifying device employs the tail lamps 8; however, the tail lamps 8 are merely an example. The notifying device may additionally use sound, voice, or vibration. Alternatively, a door mirror may be moved, or a headlight or a directional lamp may be lit. Still alternatively, the information control device 10 may control the key device 7a with radio waves so that the key device 7a makes a notification.

Further alternatively, with regard to that the user may lock the doors manually (or that the user does not use the key device 7a), the notification for the necessity of power charge may be made by emitting light from the instrument panel, a room lamp, a foot lamp, or the like, in the vehicle cabin when the doors are locked.

Further alternatively, the control may be performed depending on whether or not the door of driver's sheet has been locked, or depending on whether or not all doors of the vehicle V have been locked.

Meanwhile, a system is known which causes the door lock mechanism 7 to automatically lock the doors of the vehicle V without the operation by the user with the key device 7a if the key device 7a is separated from the vehicle V by a predetermined distance, i.e., if the user who carries the key device 7a moves away from the vehicle V and hence the communication between the key device 7a and the vehicle V is discontinued. With this system, if the remaining power amount is small when the doors are locked, the notification start condition is satisfied (see S1 in FIG. 4), and the notification is continued from the start of the notification to the end of the timer (YES in S5 in FIG. 4).

In the first embodiment, it is judged that the notification start condition is satisfied if the remaining power amount of the high-voltage battery 1 is the threshold or smaller and if the state of the door lock mechanism 7 is changed to the lock state (or if the doors are locked) (see S1 in FIG. 4). Alternatively, a notification start condition may be satisfied if a lock instruction is given to the door lock mechanism 7 (or if the doors are locked). Namely, it may be judged that the notification start condition is satisfied if the remaining power amount of the high-voltage battery 1 is the threshold or smaller and if the instruction for causing the state of the door lock mechanism 7 to the lock state is detected. If the lock instruction is given to the door lock mechanism 7, it is conceivable that the user intends to move away from the vehicle V regardless of whether or not the doors are actually locked. Also in this case, the information may flow from the door lock mechanism 7 to the lock operation detector 11 and then to the notification controller 13.

It is to be noted that the judgment in this case belongs to the technical scope of the embodiment of the present invention.

Second Embodiment

Next, a second embodiment will be described. The second embodiment is an embodiment that inhibits the notification from being made if a key is in the vehicle cabin or if the user is in the vehicle cabin. The same reference signs refer the same components in the drawings as those of the first embodiment, and the redundant description will be occasionally omitted. Also, the drawings used in the first embodiment will be referenced.

A vehicle V (see FIGS. 1A and 1B) according to this embodiment is different from the vehicle V of the first embodiment in that the vehicle V includes a known key sensor that detects the key in the vehicle cabin with radio waves. For example, the key sensor radiates radio waves (question waves) from an antenna provided in the vehicle cabin, and detects response waves (response waves from a radio frequency identification tag assigned to the key) from the key (key device 7a, see FIG. 2) that replies to the radiated waves, by the antenna. In addition, the vehicle V includes a human-presence sensor (seating-state sensor) that detects the presence of a person in the vehicle cabin by using a change in capacitance caused by infrared radiation from the person or the presence of the person. Both sensors are known and hence are not shown in the drawing.

Figure 5:
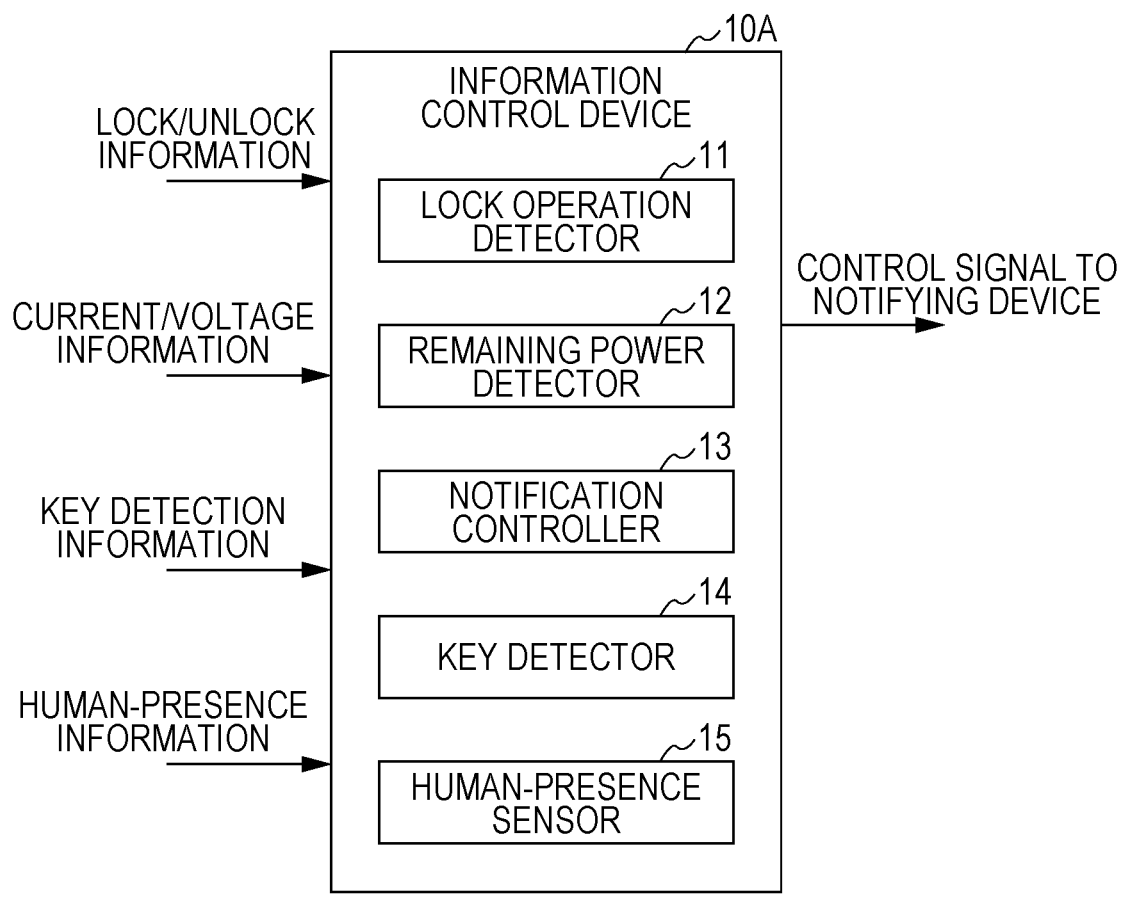
FIG. 5 illustrates a configuration of the information control device according to the second embodiment of the present invention.

FIG. 5 illustrates a configuration of an information control device 10A according to the second embodiment.

Referring to FIG. 5, the information control device 10A according to the second embodiment includes a key detector 14 and a human-presence sensor 15 in addition to the configuration of the information control device 10 according to the first embodiment.

The key detector 14 has a function for detecting the presence of the key in the vehicle cabin based on information (key detection information) from the above-described key sensor. The human-presence sensor 15 has a function for detecting the presence of a person in the vehicle cabin based on human-presence information from the above-described human-presence sensor.

In the second embodiment, the notification controller 13 does not make the ineffective notification to the outside of the vehicle by the notifying device such as the tail lamps 8. This is because the notification controller 13 judges that the notification start condition is not satisfied in the second embodiment if the key (the key device 7a) is in the vehicle cabin although the notification start condition according to the first embodiment is satisfied. In the second embodiment, since the notification controller 13 judges that the notification start condition is not satisfied although the notification start condition according to the first embodiment is satisfied, if the human-presence sensor senses the presence of a person, the notification to the outside of the vehicle V is not made by the notifying device such as the tail lamps 8.

Advantage of Embodiment

With the second embodiment, since the notification start condition is not satisfied, for example, when the doors are locked when the user drives the vehicle V, unnecessary information is not provided for the people around the vehicle V, such as a person who drives the other vehicle. The electric power can be saved. Also, the notification start condition is not satisfied such as when the vehicle V is briefly stopped at a roadside and the user checks whether the doors are open or closed while the user stays in the vehicle V. Thus, the timing for charge can be properly guided.

Modification of Embodiment

The method for detecting whether or not the key is in the vehicle cabin is not limited to the specific technique. Also, the human-presence sensor is not particularly limited.

The notification start condition may not be satisfied if vehicle-speed pulses are detected (for example, if the vehicle speed is not 0) in addition to the detection of the key and person. Alternatively, the notification start condition may not be satisfied if the driving motor 4 rotates or if an engine rotates in the case of a hybrid vehicle. Still alternatively, the notification start condition may not be satisfied if an idle stop condition is satisfied or a seatbelt is fastened.

A condition (for example, detection of vehicle-speed pulses) that does not satisfy the notification start condition may be a notification end condition for ending the notification which is being currently made.

Third Embodiment

Next, a third embodiment will be described. The third embodiment is an embodiment in combination with a positioning system. The same reference signs refer the same components in the drawings as those of the first embodiment, and the redundant description will be occasionally omitted. Also, the drawings used in the first embodiment will be occasionally referenced.

A vehicle V (see FIGS. 1A and 1B) according to this embodiment is different from the vehicle V according to the first embodiment in that the vehicle V includes a vehicle-mounted positioning system. The positioning system has a function for recognizing the latitude and longitude (and altitude) of the self position (the position of a receiving antenna) by substantially simultaneously receiving radio waves (orbit information of satellites and time information) via the antenna from at least 4 global positioning system (GPS) satellites from among 30 GPS satellites that orbit around the Earth and transmit the radio waves toward the ground. Further, the positioning system has a function for recognizing a relative position by inertial navigation with use of the vehicle-speed pulse or a yaw rate if the antenna cannot receive the radio waves from the GPS satellites because the vehicle V is in a tunnel or behind a mountain or a building. With these functions, the positioning system recognizes the position (latitude and longitude) of the vehicle V with the system mounted within an accuracy range from several meters to 10 meters. The positioning system is known and hence is not described or illustrated in more detail.

Figure 6:
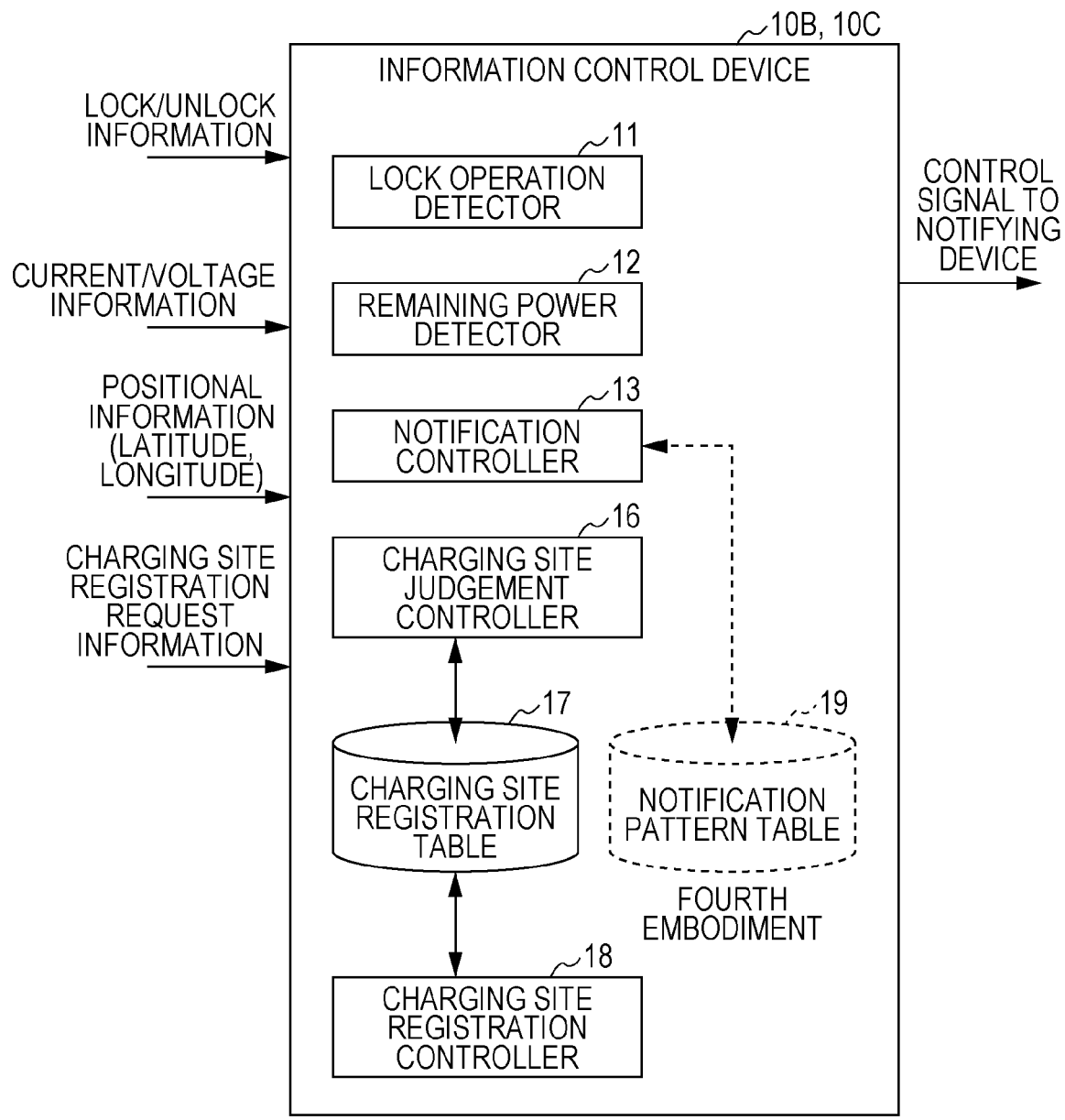
FIG. 6 illustrates a configuration of an information control device according to third and fourth embodiments of the present invention.

FIG. 6 illustrates a configuration of an information control device 10B according to the third embodiment.

Referring to FIG. 6, the information control device 10B according to the third embodiment includes a charging site judgment controller 16, a charging site registration table 17, and a charging site registration controller 18 in addition to the configuration of the information control device 10 according to the first embodiment. A notification pattern table 19 indicated by broken lines is used in a fourth embodiment and hence will be described later.

The charging site judgment controller 16 in FIG. 6 according to the third embodiment has a function for acquiring positional information (latitude and longitude) of the vehicle V from the positioning system (not shown), referencing the charging site registration table 17, and judging whether or not the current position is the home, a charging facility is located at the current position, and the charging facility is located near the current position, i.e., whether or not the current position is a position available for power charge.

The charging site registration table 17 stores information about positions available for power charge, such as the position of the home and the position of the charging facility, in association with the positional information (latitude and longitude). The charging site registration table 17 is stored in a flash memory in a non-volatile manner. The charging site registration controller 18 has a function for registering, as a position available for power charge, the positional information (latitude and longitude) acquired from the measurement system in the charging site registration table 17, if the user gives charging site registration information (bookmark request) through an input device (not shown). Accordingly, the user can register a charging site used in the past and a charging site found when the vehicle has passed by the site in the past, in the charging site registration table 17 in a manner like bookmarking. When the user registers the positions available for power charge in the charging site registration table 17, the user can register positional information (positions available for power charge) with names like "home" and "xxx charging station."

In the third embodiment, the notification controller 13 does not make the notification to the outside of the vehicle V (the user outside the vehicle V) by the notifying device such as the tail lamps 8 although the notification start condition according to the first embodiment is satisfied unless the current position of the vehicle V is the position available for power charge. The position is judged as the position available for power charge if the charging site judgment controller 16 retrieves the charging site registration table 17 by using positional information (latitude and longitude) acquired from the positioning system and as the result, if the current position of the vehicle V is registered in the charging site registration table 17. If the current position of the vehicle V is not registered in the charging site registration table 17, the charging site judgment controller 16 judges that the position is not the position available for power charge.

In the above description, the position available for power charge is registered in the charging site registration table 17 by the user through the input device (not shown) in the above description. Alternatively, since the remaining power detector 12 can recognize whether or not the high-voltage battery 1 is currently charged with power, the charging site registration controller 18 may use the detection result of the remaining power detector 12 and register the position available for power charge in the charging site registration table 17.

Still alternatively, since the charging facility typically communicates with the vehicle V when power charge is performed, if the communication is held with the charging facility, that position may be registered in the charging site registration table 17 as the position available for power charge.

Advantage of Embodiment

With the third embodiment, no notification is made although the notification start condition (see S1 in FIG. 4) is satisfied at the position at which the vehicle V is parked, unless the position is the position available for power charge. Accordingly, the user is efficiently and properly recommended for power charge.

Modification of Embodiment

In the third embodiment, no notification to the outside of the vehicle is made although the notification start condition according to the first or second embodiment is satisfied. However, this is applied only to the third embodiment, and hence is applied to not all the embodiments of the present invention. In other words, the notification to the outside of the vehicle V may be made even at a position at which the charging facility is not located. Even at the position with no charging facility, the user may contact a service station and call a charging service vehicle for power charge during the shopping.

The charging site judgment controller 16 and other units relating thereto may be provided in the positioning system (not shown). The positioning system may be a navigation system that includes a map database and provides a route guidance. Even in these cases, the charging site judgment controller 16 and other units relating thereto may be provided in the navigation system.

Fourth Embodiment

Next, a fourth embodiment will be described. The fourth embodiment is also an embodiment in combination with the positioning system. The same reference signs refer the same components in the drawings as those of the first embodiment and the other embodiments, and the redundant description will be occasionally omitted. Also, the drawings used in the first embodiment and the other embodiments will be occasionally referenced. FIG. 6 is the drawing common to the third and fourth embodiments.

As indicated by the broken lines in FIG. 6, an information control device 10C according to the fourth embodiment includes a notification pattern table 19 in addition to the configuration of the information control device 10B according to the third embodiment.

The notification pattern table 19 has registered therein notification patterns that define types of notifications when a notification start condition is satisfied. The notification patterns include "make no notification with notification pattern 1 (notification condition 1)," "make hazard lamps blink with notification pattern 2 (notification condition 2)," and "make the hazard lamps and brake lamps blink with notification pattern 3 (notification condition 3)."

The notification pattern table 19 is also stored in the flash memory in a non-volatile manner.

Figure 7:
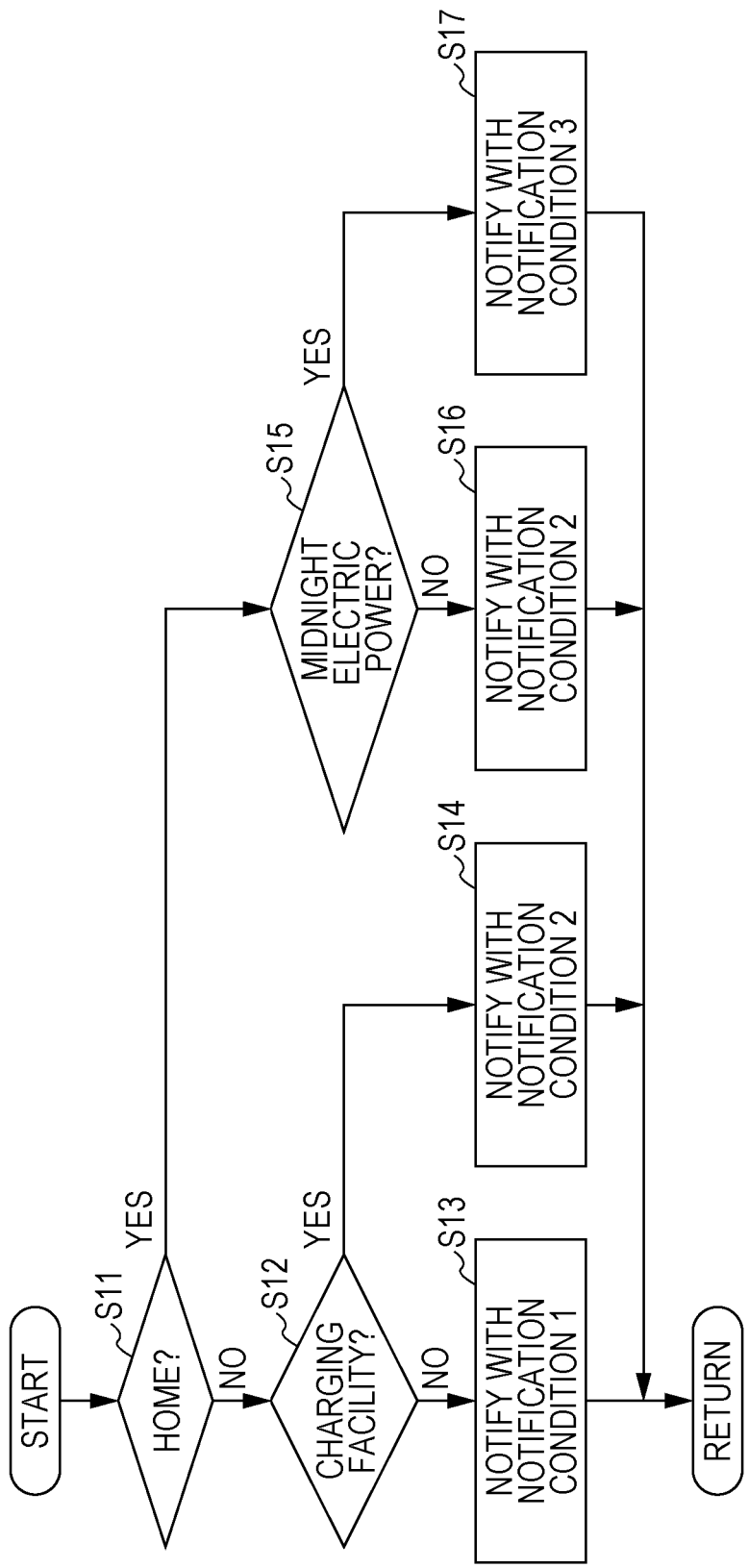
FIG. 7 is a flowchart showing processing for changing notification patterns according to the fourth embodiment of the present invention.

In the fourth embodiment, the notification controller 13 references the notification pattern table 19 to make the notification to the outside of the vehicle V. The detail for the processing will be described with reference to a flowchart in FIG. 7. It is assumed that a home-use charging facility is located at the home.

The information control device 10C (the notification controller 13) judges whether or not the position is of the home when the notification start condition according to the first embodiment is satisfied (or when it is judged whether or not the notification start condition is satisfied) (S11). If the position is not of the home (NO in S11), it is judged whether or not the position is the position available for power charge (S12). If there is no charging facility (NO in S12), a notification is made with the "notification condition 1" (S13). When the notification is made, the notification pattern table 19 is referenced. With the "notification condition 1," no notification is made. In contrast, if there is the charging facility (YES in S12), the notification is made with the "notification condition 2" (S14). The notification with the notification condition 2 is blinking of the hazard lamps, with reference to the notification pattern table 19.

The judgment on whether the position is of the home or the charging facility is similar to the processing for the judgment on whether or not the position is "the position available for power charge" described in the third embodiment. Hence, the description will be omitted. The processing in steps S12, S13, and S14 is substantially similar to that of the third embodiment.

In contrast, if the position is of the home in step S11 (YES in S11), it is judged whether or not the current time is within a time period available for midnight electric power (S15). If the current time is not within the time period available for midnight electric power (NO in S15), the notification is made with the "notification condition 2" (S16). That is, by causing the hazard lamps to blink, the notification is made for the user who is outside the vehicle and locks the doors, to recommend the user for power charge. The notification is made with the "notification condition 2" if YES in step S12 or NO in step S15 (see S14 and S16).

Also, in step S15, if the current time is within the time period available for midnight electric power (YES in S15), the notification is made with the "notification condition 3" (S17). In particular, with reference to the notification pattern table 19, the notification is made to the outside of the vehicle V by using both the hazard lamps and the brake lamps (i.e., the notification is made for the user who has gotten off the vehicle V). The notification with the "notification condition 3" more strongly recommends the user for power charge than the notification with the "notification condition 2." This is because the cost of power charge with midnight electric power is lower than that with daytime electric power.

The time period available for midnight electric power varies depending on the region, country, electric power company, or even individual contract. Though not shown, the information control device 10C stores information about the time period available for midnight power at the home in the flash memory or the like.

Advantage of Embodiment

With the fourth embodiment, advantages similar to those of the first to third embodiments can be attained. In addition, the use of the midnight power is strongly recommended at the home.

Modification of Embodiment

A threshold for judging the remaining power amount of the high-voltage battery 1 (whether or not power charge is required) at the position of the home may be different from that at a position other than the home. For example, if the position is of the home, the threshold may be large so that the user is recommended for power charge even if the remaining power amount is large. This is because the cost of power charge may be low at the home. Alternatively, if the current time is within the time period available for midnight electric power at the home, the notification may be made to the outside of the vehicle regardless of the remaining power amount (regardless of the threshold).

Fifth Embodiment

Next, a fifth embodiment will be described. The fifth embodiment is an embodiment taking into account a travelable distance. In the fifth embodiment, control is performed in cooperation with a navigation system. The same reference signs refer the same components in the drawings as those of the first embodiment and the other embodiments, and the redundant description will be occasionally omitted. Also, the drawings used in the first embodiment and the other embodiments will be referenced.

Figure 8:
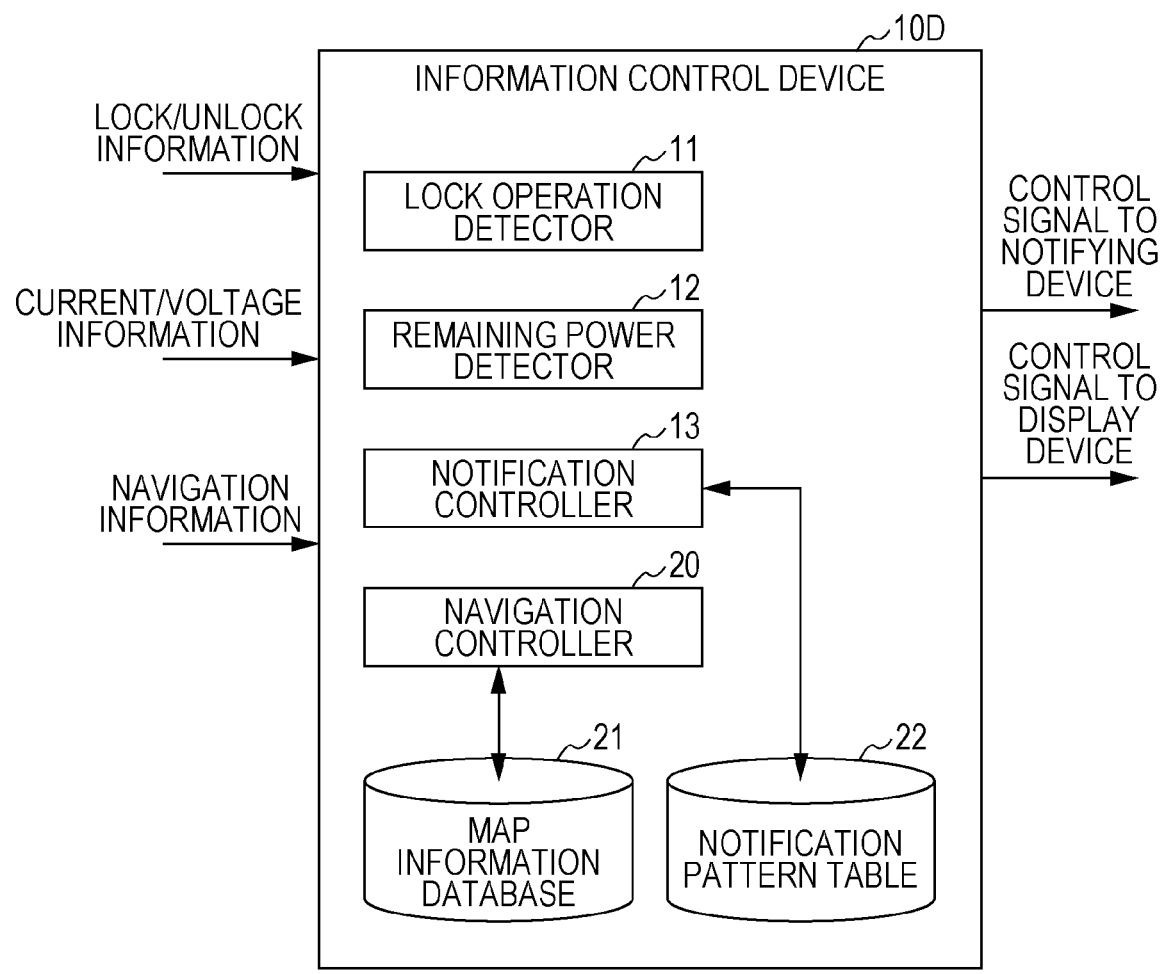
FIG. 8 illustrates a configuration of an information control device according to a fifth embodiment of the present invention.

FIG. 8 illustrates a configuration of an information control device 10D according to the fifth embodiment.

Referring to FIG. 8, the information control device 10D according to the fifth embodiment includes a navigation controller 20, a map information database 21, and a notification pattern table 22 in addition to the configuration of the information control device 10 according to the first embodiment.

The navigation controller 20 collectively has the functions of the charging site judgment controller 16 and the charging site registration controller 18 according to the third and fourth embodiments, and a typical navigation function for acquiring navigation information, referencing the map information database 21, and searching for a route. The navigation controller 20 also has a function for calculating the travelable distance based on the remaining power amount of the high-voltage battery 1 detected by the remaining power detector 12, and judging whether or not the vehicle is reachable to, for example, the destination. Information (control signal) generated by the navigation controller 20 is transmitted to a display device (not shown) in the vehicle cabin, and is displayed for the user in the vehicle cabin.

The map information database 21 has all information of the charging site registration table 17 according to the third and fourth embodiments, and functions as a navigation map information database.

Figure 9:
FIG. 9 illustrates an example of a notification pattern table according to the fifth embodiment.

Referring to FIG. 9, the notification pattern table 22 has registered therein notification patterns that define types of notifications when a notification start condition is satisfied. The notification pattern table 22 determines notification patterns that are made at a transit point where the vehicle stops by before the vehicle goes to the destination. The notification controller 13 makes the notification to the user outside the vehicle with reference to the notification pattern table 22. The judgment whether or not the position at which the vehicle has stopped is the transit point can be made such that it is judged whether or not a position at which the vehicle has stopped (or at which the doors have been locked or the doors are to be locked) before the vehicle goes to the destination is the transit point under a condition that the destination has been registered in the navigation system.

In addition to the notification pattern table 22, the map information database 21 is also stored in the flash memory in a non-volatile manner.

FIGS. 10A to 10D illustrate operations according to the fifth embodiment. The operations according to the fifth embodiment, that is, an operation of the information control device 10D (the notification controller 13) will be described with reference to FIGS. 10A to 10D.

In this embodiment, when the vehicle V departs from the home for the destination, the navigation controller 20 searches for a route and determines the route to the destination. The user drives the vehicle V to travel toward the destination.

It is assumed that the user stops the vehicle V at a transit point in the course of the route and takes a rest.

The navigation controller 20 judges whether or not the vehicle V is reachable to the destination if power charge is not performed at the transit point where the vehicle V is currently stopped (parked) based on the remaining power amount of the high-voltage battery 1 detected by the remaining power detector 12, and also judges whether or not the vehicle V is reachable to the nearest charging station (position available for power charge) in an area closer to the destination than the transit point. Then, the results are transmitted to the notification controller 13.

The notification controller 13 judges whether or not the notification start condition is satisfied like the first embodiment, synchronously with the processing by the navigation controller 20. If the notification start condition is satisfied, the notification controller 13 determines the type of the notification by using the notification pattern table 22 and the information transmitted from the navigation controller 20.

Figure 10A:
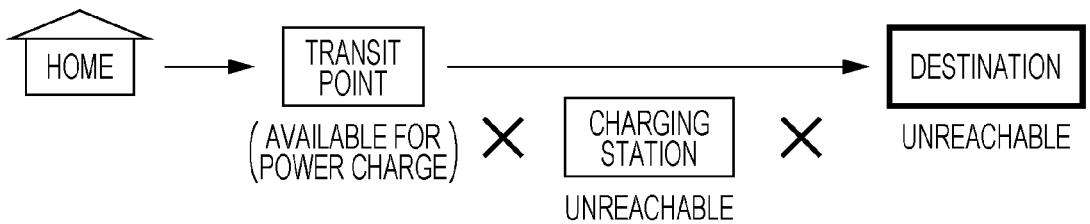
FIGS. 10A, 10B, 10C, and 10D illustrate operations according to the fifth embodiment of the present invention, in particular.

In particular, if it is judged that the notification start condition is satisfied at the transit point and if it is judged that the vehicle V is unreachable to the nearest charging station in the area near the destination or to the destination, referring to FIG. 10A, the notification controller 13 recommends the user outside the vehicle V for power charge by fast blink of light and sound with the "notification pattern 1." This is because the remaining power of the high-voltage battery 1 may be used up unless power charge is performed at the transit point where the vehicle V is currently stopped. If power charge is not performed, the vehicle V may use up electric power (corresponding to running out of gas for a gasoline vehicle). Accordingly, when the indicator in the vehicle cabin displays that the remaining power amount is small, even if the user misses the display or the user does not pay attention to the display, the user can notice that the remaining power amount is small. If the user charges the battery with power as the result of the notification, power charge can be performed during the rest time, resulting in the effective use of time as compared with that the notification is made after the rest is taken.

For example, the sound may be chime sound, melody, beep, or vibration sound. Since the notification is made with the sound, the vehicle V may include as a notifying device a device that outputs the chime sound or the like to the outside of the vehicle V.

Figure 10B:
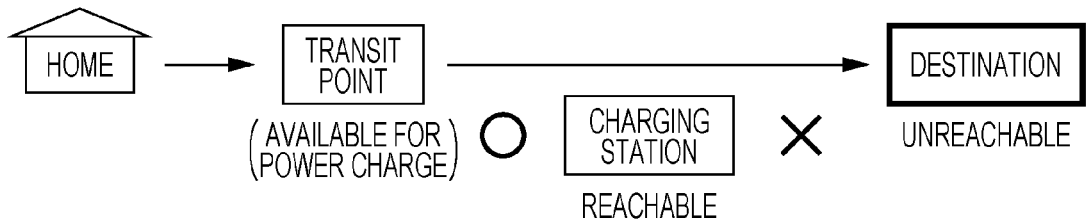

Referring to FIG. 10B, if the vehicle V is reachable to the nearest charging station but unreachable to the destination, a notification is made by several-time blink of light with the "notification pattern 2." The notification is weaker than that in FIG. 10A because the vehicle V is unreachable to the destination but reachable to the charging station in the course of the route.

Figure 10C:
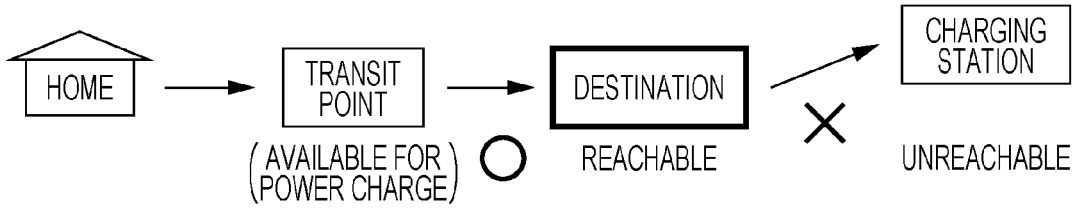
Figure 10D:
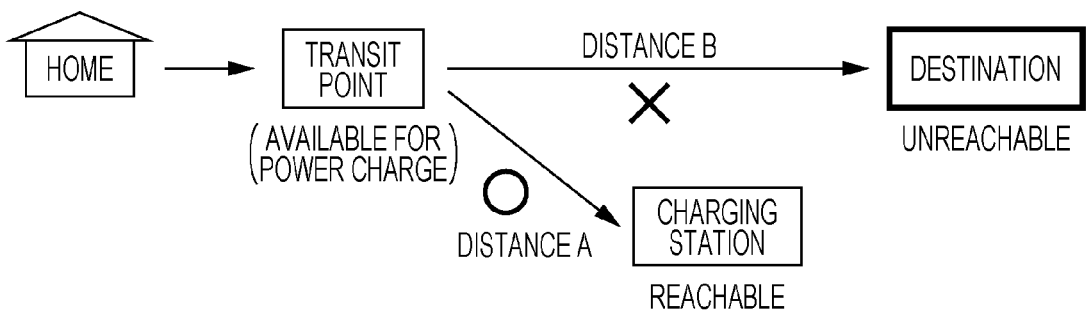

Referring to FIG. 10C, if the vehicle V is reachable to the destination but unreachable to the nearest charging station, a notification is made by sound with the "notification pattern 3." In this example, the nearest charging station is farther than the destination. The notification is weaker than that in FIG. 10A because the vehicle can reach the destination. If it is already known that the battery cannot be charged with power at the destination, a strong notification may be made like the notification pattern 1.

Though not shown, when the notification start condition is satisfied, if the vehicle V is reachable to the destination and the nearest charging station, the notification with the "notification pattern 3" may be made like the example in FIG. 10C. That is, in this example, the notification is made by the sound for the user who has gotten off the vehicle V for taking a rest.

Since a person has to pass a vision screening to get (update) a driving license, the "notification pattern 2" uses the light and the "notification pattern 3" uses the sound. The order of the light and sound may be inverted.

Advantage of Embodiment

With the fifth embodiment, the notification can be properly made based on whether or not the vehicle V is reachable to the destination in cooperation with the navigation system. Further, with the fifth embodiment, the notification can be properly made by taking into account whether or not the vehicle V is reachable to the nearest charging station (position available for power charge) from the current position (transit point) in cooperation with the navigation system.

Modification of Embodiment

In FIGS. 10A and 10B, the charging station located on the route to the destination is taken into account. However, if the vehicle is unreachable to the destination and if no charging station is located on the route to the destination (distance B>distance A) like the example in FIG. 10D, the notification may be made by taking into account a charging station that is deviated from the route. In this case, the notification pattern is properly changed to cause the user to recognize that the charging station is deviated from the route.

Sixth Embodiment

Next, a sixth embodiment will be described. The sixth embodiment is an embodiment taking into account a travelable distance. The same reference signs refer the same components in the drawings as those of the first embodiment and the other embodiments, and the redundant description will be occasionally omitted. Also, the drawings used in the first embodiment and the other embodiments will be occasionally referenced.

For example, a use pattern of the vehicle V can be considered in which an electric vehicle (vehicle V) usually travels on a predetermined route such as a route between the home and an office or a route between a sales branch and a customer. With this use pattern, for example, it is judged whether or not the vehicle can travel next with the current remaining power amount of the high-voltage battery 1 by a last travel distance. The result is noticed (notified) to the user of the vehicle V.

Figure 11A:
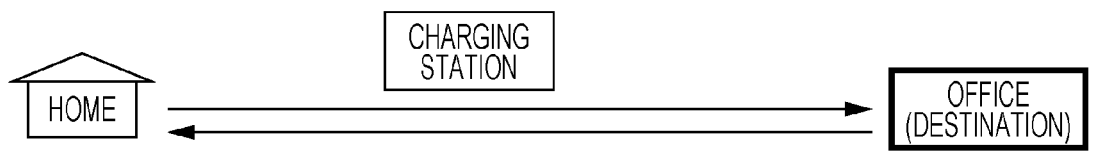
FIGS. 11A and 11B illustrate operations according to a sixth embodiment of the present invention, in particular.

In this case, for example, as shown in FIG. 11A, it is assumed that the user, who usually travels on the route between the home and the office (destination), reaches the office and locks the doors of the vehicle V. The information control device 10 (for example, 10D) makes the judgment at this time. As the result, if it is judged that the vehicle V cannot travel next by the last travel distance with the current remaining power amount of the high-voltage battery 1 by the last travel distance (for example, if YES in S1 in FIG. 4), the notification is started (S2 in FIG. 4). Accordingly, the notification that recommends the user for power charge can be reliably made by a simple configuration in which the last travel distance that is a travel distance from when the ignition switch is turned ON last to when the ignition switch is turned OFF last is compared with the remaining power amount of the high-voltage battery 1. Of course, the processing for the notification may be performed at the home.

Figure 11B:
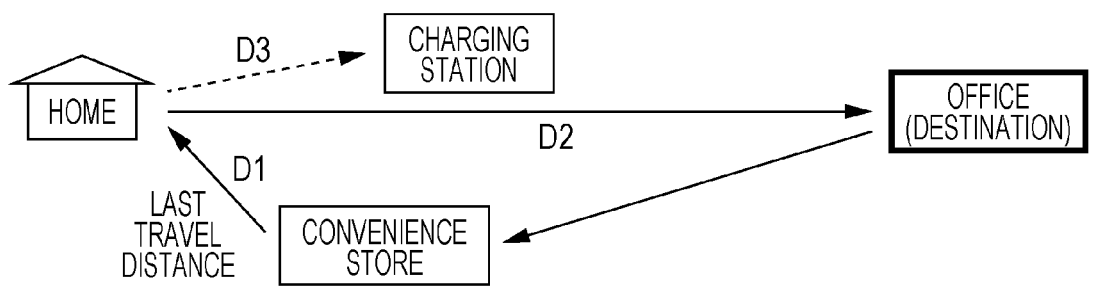

Referring to FIG. 11B, if the vehicle V stops by a convenience store (or hospital) when the vehicle V returns from the office and then goes to the home, the last travel distance between the convenience store and the home is a distance D1. In this case, the information control device 10 judges whether or not the vehicle V can travel by the distance D1 that is the last travel distance with the remaining power amount of the high-voltage battery 1 at the time when the vehicle V reaches the home. If it is judged that the vehicle V can travel by the distance D1, no notification is made.

However, even though the vehicle V can travel by the distance D1 that is the last travel distance, if the vehicle V cannot travel by a distance to the office (distance D2), it can be expected that the electric power may be used up before the vehicle V reaches the office unless the user charges the battery with power, because no notification that recommends the user for power charge is made. Occasionally, the vehicle V may travel to the nearest charging station (distance D3). Therefore, in the sixth embodiment, the possibility that the vehicle V can travel by the last travel distance is considered, and also a table shown in FIG. 12 is used to make the notification for the user outside the vehicle.

FIG. 12 illustrates a notification pattern table 23 according to the sixth embodiment. Alternatively, the notification pattern table 23 may be replaced with the notification pattern table 22 according to the fifth embodiment, or both the notification pattern tables 22 and 23 may be used.

Referring to the notification pattern table 23, for example, the first row (1st row) of the notification pattern table 23 defines that a notification with a pattern 1 is repeated three times if the vehicle V cannot travel by the last travel distance (X), is unreachable to the nearest charging station (X), or is unreachable to the destination (X) with the current remaining power amount of the high-voltage battery 1. This notification most strongly recommends the user for power charge. For another example, the last row (5th row) in the notification pattern table 23 defines that no notification is made if the vehicle V can travel by the last travel distance (O), is reachable to the nearest charging station (O), and is reachable to the destination (O) with the current remaining power amount of the high-voltage battery 1.

The information control device 10 (for example, 10D) calculates the last travel distance (distance D1) based on a value of an odometer; compares a previously registered distance to the destination (distance D2), and a previously registered distance to the nearest charging station (distance D3), with a travelable distance that is calculated from the current remaining power amount of the high-voltage battery 1; references the notification pattern table 23 to find the definition that matches with the comparison result; determines (judges) the type of the notification to be made; and makes the notification for the user outside the vehicle V for power charge through the notifying device (tail lamps 8 or the like) based on the determination.

Advantage of Embodiment

With the sixth embodiment, advantages similar to those of the first embodiment and the other embodiments can be attained. In addition, the sixth embodiment can be suitably applied to the case in which the vehicle V usually travels the predetermined route such as between the home and the office. The sixth embodiment does not need the navigation function that is provided in the fifth embodiment, or the positioning function that is provided in the fourth embodiment. As described above, the sixth embodiment needs at least the function for calculating the last travel distance, the function for calculating the next travelable distance from the remaining power amount of the high-voltage battery 1, and the function for comparing the calculated last travel distance with the calculated next travelable distance and making the notification accordingly.

Also, if the control is executed as defined in the notification pattern table 23 in FIG. 12, the sixth embodiment needs that the distance to the destination and the distance to the nearest charging station are previously registered.

Alternatively, when the sixth embodiment is implemented, the presence of the nearest charging station does not have to be considered. That is, the second field from the left of the notification pattern table 23 may be omitted.

The first to sixth embodiments of the present invention are merely examples for implementing the present invention. Therefore the embodiments of the present invention should not be limited by these embodiments. Any of the first to sixth embodiments may be combined with the other. Also, any of the first to sixth embodiments may be applied to means of transportation such as a ship (i.e., a vehicle is a type of the means of transportation).

The embodiment of the present invention is significantly applicable as a technique that properly guides a timing of power charge for transportation means such as an electric vehicle which is expected to become widely spread.

If a user locks doors and moves away from the vehicle, it is expected that a certain time period is present until the user drives the vehicle next. According to the embodiment of the present invention, if power charge is required, the device notifies the user about the necessity of power charge when the user locks the doors and moves away from the vehicle (or when the user is going to move away from the vehicle). That is, the device recommends the user for power charge when the user moves away from the vehicle. Accordingly, the user can charge the battery with power and effectively use the time, for example, by the shopping while the user stays away from the vehicle.

In other words, the configuration of the embodiment inhibits the notification indicative of the necessity of power charge from being made to the outside of the vehicle until a timing at which the doors are locked.

Also, the information control device for the electric vehicle may further include a key detector. The notification controller may inhibit the notification from being made if a key is in a vehicle cabin, based on a detection result of the key detector.

As long as the key is in the vehicle cabin, the user does not move away from the vehicle. With this configuration, the information control device does not make the notification. Accordingly, a useless notification is omitted. In other words, unnecessary information is not provided for other people.

Also, the information control device for the electric vehicle may further include a human-presence detector. The notification controller may inhibit the notification from being made if a person is in a vehicle cabin, based on a detection result of the human-presence detector.

As long as the person is in the vehicle cabin, the user does not move away from the vehicle. With this configuration, the information control device does not make the notification. Accordingly, a useless notification is omitted. In other words, unnecessary information is not provided for other people.

Also, the information control device for the electric vehicle may further include a travel detector. The notification controller may inhibit the notification from being made if the vehicle is traveling, based on a detection result of the travel detector.

As long as the vehicle is traveling, the user does not move away from the vehicle. With this configuration, the information control device does not make the notification. Accordingly, a useless notification is omitted. In other words, unnecessary information is not provided for users of the other vehicles.

According to the embodiment of the present invention, provided is an electric vehicle including the aforementioned information control device for the electric vehicle.

According to the embodiment of the present invention, provided is a method for guiding a timing of power charge. If power charge is required, the device notifies the user about the necessity of power charge when the user locks the doors and moves away from the vehicle (or when the user is going to move away from the vehicle).

With the embodiment of the present invention, the information control device etc. for the electric vehicle can be provided, the device which allows the charging time for the battery to be effectively used.

Obviously, numerous modifications and variations of the present invention are possible in light of the above teachings. It is therefore to be understood that within the scope of the appended claims, the invention may be practiced otherwise than as specifically described herein.

What is claimed is:

1. An information control device for an electric vehicle including a vehicle-mounted battery that is charged with electric power supplied from a power supply provided at an outside of the electric vehicle, the information control device comprising:
   a lock operation detector configured to detect a lock operation of a door lock mechanism of the electric vehicle;
   a remaining power detector configured to detect a remaining power amount of the vehicle-mounted battery; and
   a notification controller configured to control a notifying device to make a notification to the outside of the electric vehicle, the notification being indicative of information that recommends to begin power charge of the vehicle-mounted battery if the remaining power amount is small when the door lock mechanism has been locked or is to be locked, based on detection results of the lock operation detector and the remaining power detector.

2. The information control device for the electric vehicle according to claim 1, further comprising:
   a key detector configured to detect whether or not a key to lock the door lock mechanism is in a vehicle cabin,
   wherein the notification controller inhibits the notification from being made if the key is in the vehicle cabin, based on a detection result of the key detector.

3. The information control device for the electric vehicle according to claim 1, further comprising:
   a human-presence detector configured to detect a person by a human-presence sensor to detect whether or not a person is in a vehicle cabin, wherein the notification controller inhibits the notification from being made if the person is in the vehicle cabin, based on a detection result of the human-presence detector.

4. The information control device for the electric vehicle according to claim 1, further comprising:
a travel detector configured to detect whether or not the electric vehicle is traveling based on a vehicle speed,
wherein the notification controller inhibits the notification from being made if the electric vehicle is traveling, based on a detection result of the travel detector.

5. An electric vehicle comprising the information control device for the electric vehicle according to claim 1.

6. A method for guiding a timing of power charge for an electric vehicle, the electric vehicle traveling by a vehicle-mounted battery that is charged with electric power supplied from a power supply provided at an outside of the electric vehicle, the electric vehicle including an information control device, the information control device including a lock operation detector configured to detect a lock operation of a door lock mechanism of the electric vehicle; a remaining power detector configured to detect a remaining power amount of the vehicle-mounted battery; and a notification controller configured to control a predetermined notifying device to make a notification to the outside of the electric vehicle, the notification being indicative of information that recommends to begin the power charge of the vehicle-mounted battery based on detection results of the lock operation detector and the remaining power detector, the method being performed by the notification controller of the information control device, the method comprising:
guiding a timing of power charge by making the notification indicative of the information that recommends to begin the power charge of the vehicle-mounted battery if the remaining power amount detected by the remaining power detector is small when the door lock mechanism has been locked or is to be locked.

7. An electric vehicle comprising the information control device for the electric vehicle according to claim 2.

8. An electric vehicle comprising the information control device for the electric vehicle according to claim 3.

9. An electric vehicle comprising the information control device for the electric vehicle according to claim 4.

10. The information control device for the electric vehicle according to claim 1, further comprising a charging site judgment controller configured to determine whether or not a current position of the electric vehicle is a position available for power charge,
wherein the notification is prohibited when the charging site judgment controller determines that the current position is not the position available for power charge.

11. The information control device for the electric vehicle according to claim 10,
wherein the notification controller is configured to determine whether or not the current position is a home position and whether or not a current time is within a time period available for low-cost electric power, and
wherein, when the notification controller determines that the current position is the home position and that the current time is within the time period available for the low-cost electric power, a notification is made that is stronger than when the notification controller determines that the current time is not within the time period available for the low-cost electric power.

12. The information control device for the electric vehicle according to claim 1,
wherein the notification controller is configured to determine, based on the remaining power amount of the battery, whether or not the electric vehicle can reach a destination and whether or not the electric vehicle can reach a nearest charging station at an area closer than the destination, and
wherein, when the notification controller determines that the electric vehicle cannot reach either of the destination and the nearest charging station, a notification is made that is stronger than when the notification controller determines that the electric vehicle can reach at least one of the destination and the nearest charging station.

13. The information control device for the electric vehicle according to claim 1,
wherein the notification controller is configured to determine, based on the remaining power amount of the battery,
whether or not the electric vehicle can travel a last travel distance,
whether or not the electric vehicle can reach a destination, and
whether or not the electric vehicle can reach a nearest charging station at an area closer than the destination, and
wherein, when the notification controller determines that the electric vehicle cannot reach any of the last travel distance, the destination, and the nearest charging station, a notification is made that is stronger than when the notification controller determines that the electric vehicle can reach at least one of the last travel distance, the destination, and the nearest charging station.

* * * * *